United States Patent [19]

Forch et al.

[11] Patent Number: 5,332,234
[45] Date of Patent: Jul. 26, 1994.

[54] SEALING ARRANGEMENT

[75] Inventors: Hans Forch; Martin Granfmüller, both of Birkenau, Fed. Rep. of Germany

[73] Assignee: Firma Carl Freudenberg, Weinheim, Fed. Rep. of Germany

[21] Appl. No.: 16,335

[22] Filed: Feb. 11, 1993

[30] Foreign Application Priority Data

Feb. 26, 1992 [DE] Fed. Rep. of Germany ....... 4205862

[51] Int. Cl.⁵ ............................................. F16J 15/32
[52] U.S. Cl. ......................................... 277/48; 277/50; 277/142; 277/152; 277/175; 277/188 R
[58] Field of Search ............... 277/35, 37, 47, 48, 277/50, 142, 152, 153, 188 R, 175, 177

[56] References Cited

U.S. PATENT DOCUMENTS

| | | | |
|---|---|---|---|
| 2,746,781 | 5/1956 | Jones | 277/153 X |
| 3,306,620 | 2/1967 | Taschenberg | 277/153 |
| 3,346,265 | 10/1967 | Rhoads et al. | 277/152 |
| 3,495,843 | 2/1970 | Andersen et al. | 277/153 |
| 4,251,082 | 2/1981 | Little | 277/152 X |
| 4,427,206 | 1/1984 | Sugiyama | 277/153 |
| 5,039,115 | 8/1991 | Herbert et al. | 277/175 X |
| 5,040,804 | 8/1991 | Back | 277/188 R X |

FOREIGN PATENT DOCUMENTS

| | | | |
|---|---|---|---|
| 3019736 | 6/1981 | Fed. Rep. of Germany . | |
| 0275857 | 11/1988 | Japan | 277/152 |
| 0870810 | 10/1981 | U.S.S.R. | 277/152 |
| 0887851 | 12/1981 | U.S.S.R. | 277/152 |

Primary Examiner—William A. Cuchlinski, Jr.
Assistant Examiner—John L. Beres
Attorney, Agent, or Firm—Kenyon & Kenyon

[57] ABSTRACT

A sealing arrangement for sealing off a rod capable of lateral movement from a housing which surrounds the rod with radial clearance is disclosed. The sealing arrangement comprises a sealing ring of a polymer material, which is provided with a radially movable sealing lip and is accommodated in a sealing housing. An auxiliary sealing lip is provided, with which the housing is able to be brought into engagement by the force of a compression spring which is active in the axial direction. The sealing ring is braced by means of a guide ring against the rod, and the auxiliary sealing lip forms a one-piece component of the sealing ring.

10 Claims, 2 Drawing Sheets

SEALING ARRANGEMENT

BACKGROUND OF THE INVENTION

1. Field of the Invention

The present invention relates to a sealing arrangement for sealing off a rod capable of lateral movement from a fluid medium, in which a housing surrounds the rod with radial clearance. The sealing arrangement comprises a sealing ring of a polymeric material, which is provided with a radially movable sealing lip and is retained within in a sealing housing.

2. Description of Related Art

A sealing arrangement is disclosed in German Provisional Patent Number 30 19 736. The piston rod seal in that patent has an axially outer sealing element, which is permanently installed, in the radial direction, and surrounds the piston rod. The piston rod seal in that patent also includes an inner sealing element, which surrounds the piston rod, is preloaded against the piston rod, and is float-mounted. The seal arrangement of that patent is able to follow radial movements of the piston rod. A compression spring, operative in the axial direction, biases the inner sealing element axially in the direction of the outer sealing element, thereby forming an impervious bond between the two. The inner sealing element acts as the axial supporting element for the compression spring. The sealing arrangement of this patent is not well suited for sealing off pressurized media, because of the high rate of wear which occurs when a pressurized media is used. Moreover, the seal in this sealing arrangement is made up of two sealing rings which are manufactured separately, making manufacturing and assembly difficult.

SUMMARY OF THE INVENTION

The object of the present invention is to provide a sealing arrangement for a rod capable of lateral movement which guarantees that the seal will be able to move, will be subjected to a low rate of wear in the radial direction when sealing off pressurized media, and which is simple to manufacture and assemble.

The present sealing arrangement is provided with an auxiliary sealing lip which engages the housing under the force of a compression spring which is operative in the axial direction. The sealing ring of the present sealing arrangement is braced by means of a guide ring against the rod, and the auxiliary sealing lip is formed in one piece with the sealing ring. Bracing the sealing ring against the guide ring reduces the rate of wear that the sealing lips are subject to, and enables the sealing arrangement to demonstrate good sealing and wear properties over a long service life. The one-piece construction of the sealing ring, on to which both the sealing lip and the auxiliary sealing lip are premolded, facilitates the easy replacement of the sealing arrangement. The simplified structure of the sealing arrangement significantly reduces the danger of it being damaged during assembly. Exact location of the sealing arrangement parts relative to one another is not needed in the present sealing arrangement.

In the present invention, the guide ring may be arranged on the side of the sealing ring facing away from the medium to be sealed off, adjacent the stop face of the housing. As a result, the axial force exerted by the media pressure on the seal is absorbed by the guide ring, which is constructed of a plastic material having a gliding or self-lubricating quality. This feature reduces the mechanical stresses that the elastomeric sealing ring is subject to. The result is a lower rate of wear, better working properties, and a longer service life, as well as the capability of the seal to move in the radial direction while being subject to a low rate of wear. The working properties are not affected by high pressurization of the fluid medium which is sealed off.

In one arrangement of the present invention, the guide ring can be made of a plastic, preferably PTFE, having a gliding or self-lubricating quality, and can be snapped into the sealing ring. Accordingly, the guide ring is not a subassembly which has to be installed separately or fixed in the housing bore hole before the sealing ring is inserted. Instead, the guide ring can be snapped into the sealing ring before the sealing arrangement is inserted in the housing and thus inserted in the housing together with the sealing ring. The guide ring can be snapped with a form-locking fit into the sealing ring. In the arrangement in which the guide ring is snapped into the sealing ring to retain it there, the guide ring may be used again when the sealing ring needs to be replaced.

In another alternative arrangement, the sealing ring and the guide ring may be bonded together adhesively. The sealing ring in this arrangement is supported by the guide ring independent of its own radial deflections. The guide ring, again consisting preferably of PTFE, may be reinforced to prolong its service life.

To provide an effective seal against the pressurized medium to be sealed off, the sealing lip and the auxiliary sealing lip are formed by converging sealing surfaces. These sealing surfaces form a larger angle with the surfaces which are sealed off on the side facing the pressurized medium than on the side facing away from the medium.

The sealing lip arrangement of the present invention is particularly advantageous because the sealing lip demonstrates a dynamic sealing action. When the rod which is sealed off moves axially, the result is a greater wiping effect in the one direction than in the other, in dependence upon the particular conditions of the application. This wiping action is a result of the different angles which the sealing lip makes with the sealed-off surfaces. This wiping action has the effect that, in conjunction with radial deflections of the rod to be sealed off, any of the fluid medium to be sealed off which has already passed by the dynamic sealing lip is forced in the direction of the space containing the fluid medium when there is a change of direction of movement of the rod.

An annular helical spring can be provided for the sealing lip so that good sealing is assured for the axially movable rod, both in the case of low and high pressurization.

Another advantageous arrangement provided in the present invention is a stop buffer, premolded in one piece with the sealing ring, which limits radial deflections of the rod in the direction of the sealing housing. The stop buffer can have a radial clearance from the sealing housing that is 0.2 to 0.8 times the size of the radial gap bounded by the guide ring and a housing projection. The advantage of having the stop buffer strike against the sealing housing before the guide ring can strike against the housing projection is that extreme deflections of the rod, together with the sealing action, are gradually dampened when the stop buffer makes contact with the sealing housing.

The progressive damping characteristic of the stop buffer prevents impact noises which could arise in the seal. Only in extreme cases, unlikely to occur during normal operation, would the guide ring strike against the housing projection.

A reinforcement ring is provided to stabilize the sealing ring. This reinforcement ring is at least partially surrounded by sealing ring material, and is oriented such that the compression spring only touches the reinforcement ring. In this feature of the present invention, the compression spring is braced on one end against the sealing housing, which is preferably constructed of a metallic material and is braced on the other end against the reinforcement ring, which is also constructed of a metallic material. This arrangement prevents wear or damage to the parts which come into contact with one another when there is relative movement between the sealing ring and the compression spring or between the compression spring and the sealing housing. The surfaces which do come into contact with one another can be provided with a friction-reducing surface coating. Such a surface coating reduces mechanical stresses, particularly those acting on the sealing lip, during radial deflections of the rod. The sealing ring can thus follow deflections of the rod quite while maintaining a good seal, over an especially long service life.

The compression spring can be a cup or disc spring. This type of spring allows the axial dimension of the sealing arrangement to be particularly small. When the cup or disc spring is arranged in the axial direction between the reinforcement ring and the sealing housing, the spring tensions, which change with changing spring excursions, can be advantageously utilized. In another arrangement, the compression spring can be a helical spring. On the side facing the seal, this helical compression spring can be guided through a projection which is premolded in one piece with the sealing ring.

The axial preloaded force of the compression spring is adjusted to be greater than the axial frictional force acting on the sealing lip of the sealing ring when there is an axial displacement of the rod. Thus, at all times there is adequate contact pressure between the auxiliary sealing lip and the surface of the housing to be sealed off.

BRIEF DESCRIPTION OF THE DRAWINGS

The sealing arrangement of the present invention will be described in the following on the basis of the enclosed drawings.

DESCRIPTION OF THE PREFERRED EMBODIMENTS

Figure 1:
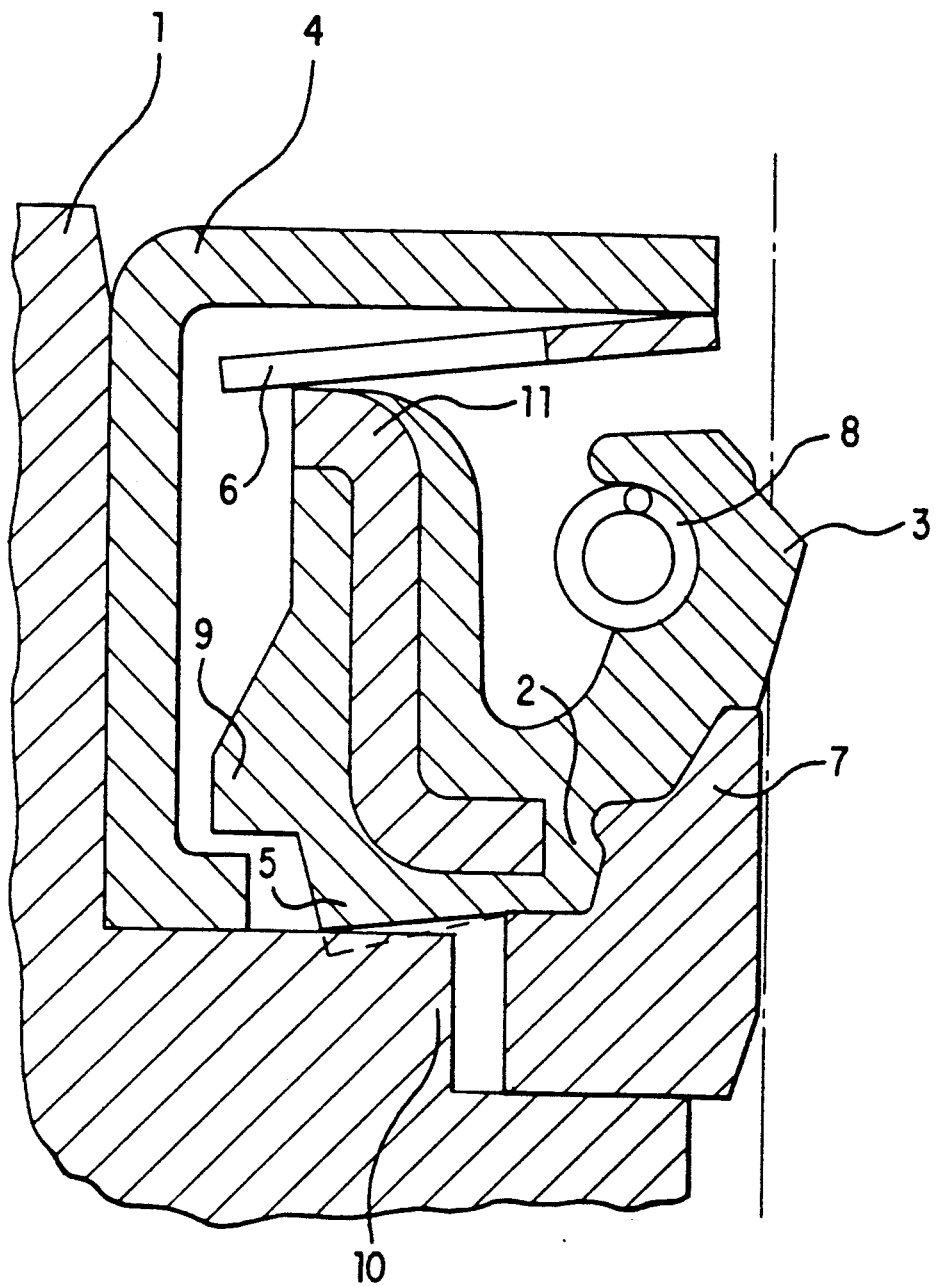
FIG. 1 shows a cross-sectional view of the sealing arrangement of the present invention, in which the compression spring is a cup or disc spring.

FIG. 1 shows a first embodiment of the sealing arrangement according to the present invention. This sealing arrangement is suited for sealing off a fluid medium, pressurized at up to 120 bar. The sealing housing 4 accommodates a sealing ring 2, a compression spring 6—in the embodiment of FIG. 1, a cup or disc spring—and a guide ring 7. The sealing housing 4 is inserted in a bore hole of the housing 1. The sealing housing 4 has an essentially U-shaped profile, open in the direction of the rod (shown here with a dotted line representation) and surrounds the sealing ring 2 with a radial clearance. A rod sealing lip 3, biased by a helical spring 8, seals against the outer radial surface of the rod, as is known in the art. To facilitate assembly, the sealing housing 4 surrounds the sealing ring 2 so as to allow the stop buffer 9—which extends in the radial direction and is formed in one piece with the sealing ring 2—to abut, before being mounted, in the axial direction against the radially inwardly-pointing lateral side of the U-shaped profile. After the sealing arrangement is mounted in the housing, which is accomplished by inserting it axially into the bore hole of the housing 1, the sealing housing 4 is brought to rest in the axial direction against a housing projection 10. The stop buffer 9 is spaced from the sealing housing by an axial clearance, so that the sealing ring 2 only sealingly abuts against the housing in the vicinity of the quasi-statically loaded auxiliary sealing lip 5. In the embodiment depicted in FIG. 1, the guide ring 7 is snapped into or adhesively bonded to the sealing ring 2. As a result of the bracing of the cup spring on one side against the sealing housing 4 and, on the other side, against the boundary edge of a reinforcement ring 11, the spring tension acting on the auxiliary sealing lip 5 changes during radial deflections of the sealing ring 2. A sealing arrangement of a similar form could also be designed as a modular seal. In that arrangement, the auxiliary sealing lip 5 would be braced against a radially inwardly-pointing lateral side of the sealing housing. However, a disadvantage of such an arrangement would be that the sealing housing 4 would have to be additionally sealed off from the housing 1, which would mean a more complex manufacturing process would have to be used.

Figure 2:
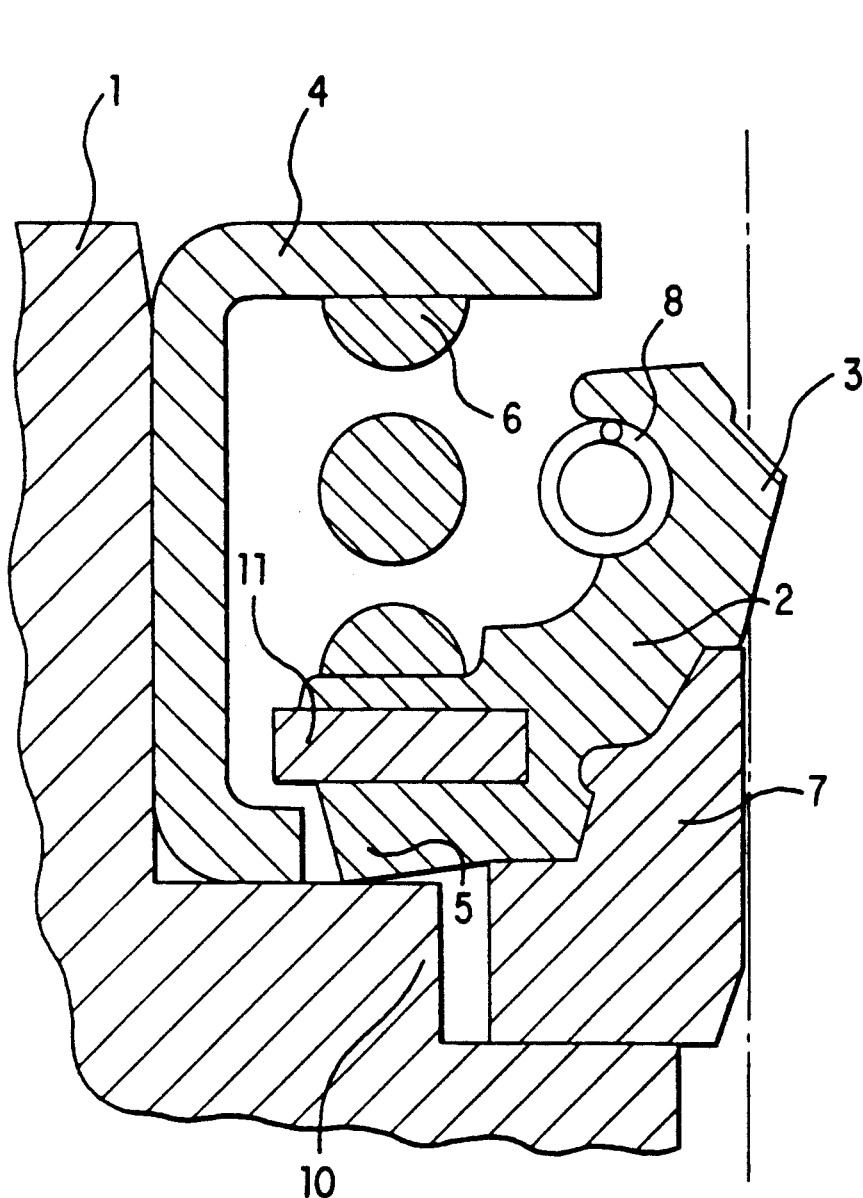
FIG. 2 shows a cross-sectional view of the sealing arrangement of the present invention, in which the compression spring is a helical compression spring.

The sealing arrangement of FIG. 2 is very similar to the sealing arrangement of FIG. 1. Instead of a cup spring, a helical spring is used as the compression spring 6. This helical spring is arranged in the axial direction, on one end, against the sealing housing 4 and, on the other end, against a reinforcement ring 11 which extends in the radial direction. The auxiliary sealing lip 5 sealingly abuts on the housing 1 in this embodiment, as with the embodiment of FIG. 1. In case of radial displacements of the rod (shown here in a dotted line representation), both the sealing ring 2 and the guide ring 7, which are affixed to one another, move in the same manner in the radial direction. The support ring 7 preferably is constructed of PTFE, as is also true of the sealing ring of FIG. 1. The entire sealing arrangement adapts very well to the radial deflections of the rod. The sealing arrangements of FIGS. 1 and 2 are preferably used to seal off fluids under high pressure. The axial force, exerted by the fluid medium to be sealed off is absorbed by the guide ring 7. The guide ring is disposed in a recess of the housing 1 and is braced against this housing.

We claim:

1. A sealing arrangement for sealing off a rod from a housing surrounding the rod with a radial clearance, comprising:
    a sealing ring of a resilient material, said sealing ring comprising a radially movable sealing lip, said sealing ring being accommodated in a sealing housing, said sealing ring comprising an auxiliary sealing lip, said auxiliary sealing lip being formed in one piece with said sealing ring;
    a compression spring operative in the axial direction to bias the auxiliary sealing lip against said sealing housing;

a guide ring, said guide ring bracing said sealing ring against said rod, said guide ring further supporting said sealing ring in said housing for radial movement, said guide ring being located on a side of said sealing ring opposite said compression spring.

2. The sealing arrangement of claim 1, wherein:
the guide ring is constructed of PTFE.

3. The sealing arrangement of claim 1, wherein:
the guide ring is snapped into engagement with the sealing ring.

4. The sealing arrangement of claim 3, wherein: the sealing lip and the auxiliary sealing lip are formed by converging sealing surfaces, and
wherein the sealing surfaces form a larger angle with respect to the surfaces against which said sealing lip and said auxiliary sealing lip seal on the side facing a fluid medium to be sealed off than the angle formed by the side facing away from the fluid medium.

5. The sealing arrangement of claim 1, wherein: the sealing ring and the guide ring are bonded together adhesively.

6. The sealing arrangement of claim 5, further comprising:
an annular helical spring biasing the sealing lip to the rod.

7. The sealing arrangement of claim 1, wherein:
the sealing ring at least partially surrounds a reinforcement ring, and the compression spring touches only the reinforcement ring on the end of the compression spring which faces the sealing ring.

8. The sealing arrangement of claim 1, wherein:
the compression spring a cup spring.

9. The sealing arrangement of claim 1, wherein:
the compression spring exhibits an axial preloaded force which is greater than the axial frictional force acting on the sealing ring during axial displacement of the rod.

10. The sealing arrangement of claim 1, wherein
said sealing ring further comprises a stop buffer formed in one piece with the sealing ring, said stop buffer limiting radial deflections of the sealing ring in the direction of the sealing housing, and
wherein the stop buffer has a radial clearance from the sealing housing that is 0.2 to 0.8 times the distance of a radial gap between the guide ring and a housing projection.

* * * * *

UNITED STATES PATENT AND TRADEMARK OFFICE
CERTIFICATE OF CORRECTION

PATENT NO. : 5,332,234
DATED : July 26, 1994
INVENTOR(S) : Hans Forch, et al

It is certified that error appears in the above-indentified patent and that said Letters Patent is hereby corrected as shown below:

Column 4, line 63, before "comprising" insert ---further---.

Column 4, line 67, after "said" delete ---sealing---.

Signed and Sealed this

Twenty-seventh Day of December, 1994

Attest:

BRUCE LEHMAN

Attesting Officer     Commissioner of Patents and Trademarks